May 7, 1935.  P. L. O'DONNELL  2,000,475
ADHESIVE MATERIAL
Filed Feb. 11, 1932
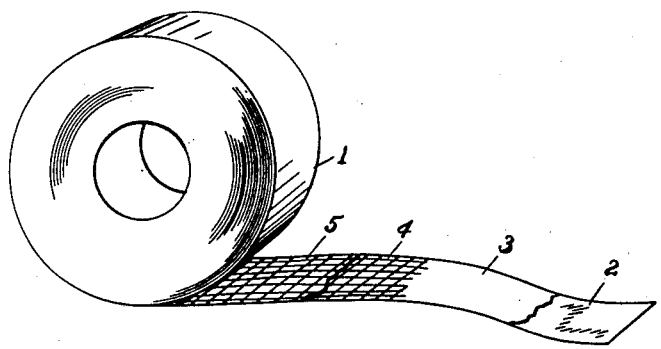
Inventor
Philip L. O'Donnell
By Murray and Zugelter
Attorneys Patented May 7, 1935

2,000,475

UNITED STATES PATENT OFFICE 2,000,475

ADHESIVE MATERIAL

Philip L. O'Donnell, Cincinnati, Ohio

Application February 11, 1932, Serial No. 592,303

5 Claims. (Cl. 154—43)

The present invention relates to adhesive sheets and tapes of the type which is characterized by its ready application to surfaces of practically all kinds without requiring any previous conditioning to assure its adhesion to such surfaces, and has for its principal object the provision of sheeting or tape which is relatively inexpensive of manufacture and which possesses the highly desirable qualities of having a very active non-drying adhesive face and a back or reverse side upon which the material of the adhesive side has a very mild adhesion.

Another object is to provide tape or sheeting of this kind which possesses a backing of exceptionally impervious material and a means whereby the commonly used non-drying adhesive coating substance may be attached to one face of such material, thus forming a tape or sheeting wherein the adhesive side is readily separable from the non-coated side of another piece or portion in a roll or stack of sheeting without the necessity for slip-sheeting or for any special treatment of the backing material.

Another object is to provide as a means for fixing non-drying adhesive to a backing material which will not stick to it, a substance which will reinforce and strengthen the backing material.

Another object is to provide a sheet or tape of this kind that will neither stretch nor fray and which will not absorb water or other liquids or solvents. These and other objects are attained by the means described herein and are shown in the accompanying drawing, in which:

The figure represents a roll of tape of the invention, at the end of which parts are broken away to show the construction thereof.

The invention consists broadly in the provision of a relatively inexpensive thin base or backing of material which is non-porous and nonabsorbent of liquids that are intended or are apt to come in contact therewith and the adherence of which to the various non-drying adhesives is negligible, and then fixing to such a base or backing a very light thin coating of non-drying adhesive by means of a strong coarsely woven or reticulated flexible material which is exceedingly adherent to both the non-drying adhesives and such other types of adhesives as will firmly and non-removably affix this reticulated material to the base.

I have found that backing materials which fulfill the requirements above noted are generally capable of being securely glued or adhesively affixed by means of water soluble adhesives such as gum-arabic and kindred adhesives which are capable of coating in very thin layers and which have great flexibility when dry.

Depending upon the nature of the intended use of the tape or sheeting the thin backing material may be either impervious to and nonabsorbent of water and subject to attack by other liquids such as paint solvents or it may be non-absorbent of and not attacked by any of such liquids. The application of a thin gauze or reticulated member by means of a water soluble adhesive such as gum-arabic will reinforce the backing material so that the backing material may be thin and of only moderate normal strength and still present a very tough composite material when reinforced by the reticulated material. The water soluble adhesive is protected by the application of the non-drying adhesive over the exposed side of the reticulated material because the non-drying adhesive is in itself of a water repellent nature.

Referring now to the drawing, 1 represents a roll of adhesive tape of the invention and consists of a backing 2 which is preferably made of sheeted water-proof viscose obtainable in the market under the name of cellophane but may be of thin oiled paper if the sheeting or tape is to be used only in connection with water or other liquids which will be repelled by that material. On one face of the backing 2 is applied a coating of suitable drying adhesive such as an adhesive of a gum-arabic base whereupon a sheeting of very thin coarsely woven reticulated material such as gauze 4 is adhesively attached to the backing by the adhesive material 3.

On this composite tape or sheet material is applied a very thin coat of non-drying pressure active adhesive 5 such as the commonly known and used rubber base or zinc oxide base adhesive. This coating is preferably light enough to avoid filling up the spaces between the threads of the reticulated material to the end that while the drying adhesive will be protected by a thin film of non-drying adhesive, and the threads of the reticulated material will appear somewhat in relief on the backing. These threads being likewise coated with the thin film form a myriad of intersecting adhesive lines of contact with the surface to which the material is to be applied and provide a myriad of intervening tiny vacuum cups. This allows for good adherence of a strip or sheet of the material to a surface but such sheet or strip may be removed with a minimum of effort by merely pulling the end of the strip or sheet and pulling said material from the surface. The natural cohesion of the non-drying material and the numerous small spaced lines of adhesion on the surface precludes any tendency to tearing the non-drying adhesive from the tape or sheet and thus obviates any deposit of the non-drying adhesive on the surface when the tape or sheet is torn away.

The tape or sheeting of the present invention has numerous applications among which is the industrial use of masking parts of a surface to be decorated with paints and the like or to protect adjacent parts during the painting or spraying operation. For such uses especially it is highly desirable to have a material which is capable of presenting a clean-cut straight edge which will not be distorted by the stretching or distension of the material of the tape or sheeting itself. The sheeted viscose backing is admirably suited to this purpose but is usually found subject to facile tearing along certain grain in the material. The application of the netting or gauze renders the backing proof against tearing while the backing, adhesively secured to the gauze prevents the gauze from being distended and stretched out of shape. The waterproof non-drying adhesive, in addition to its function of sticking the sheet or tape to a surface, effectively binds all the fibres and threads of the gauze together and precludes fraying of the gauze along the cut straight edges of the material. The non-drying adhesive, as previously explained, also materially aids in protecting the drying adhesive 3 against dampness or moisture.

The adhesive tape or sheeting of the invention is therefore adapted to storage in rolls or stacks according to convenience and the superposed layers are very readily removed one at a time because of the minimum of adhesion between the backing of one sheet and the non-drying adhesive of the one next above. In the case of tape or rolled sheeting of the present invention it is possible to pay out the tape or sheet from a roll without experiencing any of the difficulties commonly found in attempting to remove adhesive tape or sheeting of previously used kinds. The principal of these difficulties were two; first, the adhesion of the non-drying adhesive to the backing requires considerable force to overcome and, second, when overcome some non-drying adhesive would frequently be separated from the main body of adhesive and adhere to the reverse face of the material.

What is claimed is:

1. In an adhesive sheeting for masking and the like the combination of an impervious thin flexible backing material that has a low coefficient of adhesion to non-drying adhesive, a reticulated reinforcement for said backing, a flexible drying adhesive for attaching the reticulated material to the backing and a film of non-drying adhesive covering said reticulated material and said drying adhesive and conforming superficially to the mesh of the reticulated reinforcement.

2. In an article of the class described the combination of an impervious non-stretchable non-absorbent thin backing sheet, a sheet of woven material thereon, a drying adhesive fixing the woven material to said backing sheet and a non-drying adhesive coating over said woven material presenting exteriorly the pattern of said woven material, the backing material and the non-drying material having a very mild adhesion one to another.

3. In a masking material the combination of a waterproof non-stretchable and non-porous backing material of a character such that non-drying adhesives are very mildly adherent thereon, a coating of tenacious drying adhesive on one face of said material, a reticulated fibrous material secured to said backing sheet by said drying adhesive and a coating of non-drying adhesive over said reticulated material.

4. As a new article of manufacture a masking material comprising a backing of sheeted waterproof viscose, a water soluble drying adhesive on one face thereof, a woven fabric secured to the sheeting by said drying adhesive and a film of non-drying adhesive disposed over the fabric.

5. As a new article of manufacture a composite masking material comprising a thin backing sheet of sheeted viscose, a coating of drying adhesive of the character of gum-arabic, a sheet of gauze adhesively fixed to the backing material by said drying adhesive and a film of rubber base non-drying adhesive carried by the exposed face of the gauze, the exposed face of the non-drying adhesive presenting ridges occasioned by the gauze beneath.

PHILIP L. O'DONNELL.